United States Patent [19]
DiBiagio

[11] Patent Number: 5,964,498
[45] Date of Patent: Oct. 12, 1999

[54] TRAILER STEPWELL COVER MECHANISM

[75] Inventor: Anthony J. DiBiagio, Wakarusa, Ind.

[73] Assignee: Monaco Coach Corporation, Coburg, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/911,429

[22] Filed: Aug. 14, 1997

Related U.S. Application Data

[63] Continuation of application No. 08/752,752, Nov. 20, 1996, which is a continuation of application No. 08/390,991, Feb. 21, 1995.

[51] Int. Cl.⁶ .................................................. B60P 3/335
[52] U.S. Cl. ...................... 296/168; 280/164.1; 105/450
[58] Field of Search .................................. 296/181, 168; 280/163, 164.1; 105/426, 430, 450

[56] References Cited

U.S. PATENT DOCUMENTS

| | | | |
|---|---|---|---|
| 852,768 | 5/1907 | Brill | 105/450 |
| 1,032,832 | 7/1912 | Howson | 105/450 |
| 1,476,960 | 12/1923 | Elliott | 105/450 |
| 3,724,396 | 4/1973 | Roth | 105/450 |
| 3,924,545 | 12/1975 | Anders et al. | 105/450 |
| 4,174,115 | 11/1979 | Youngblood | 105/450 |
| 4,175,495 | 11/1979 | Kleim | 105/450 |
| 5,188,415 | 2/1993 | Wagner | 296/57.1 |

*Primary Examiner*—Dennis H. Pedder
*Attorney, Agent, or Firm*—Leydig, Voit & Mayer, Ltd.

[57] ABSTRACT

A stepwell cover mechanism is provided for selectively covering a stepwell cavity in a trailer. The cover mechanism broadly comprises: a cover plate (with an outboard and inboard end) for covering the stepwell cavity; an activator for selectively positioning the cover plate between a retracted position (below floor level and inboard of the stepwell cavity) and an extended position (substantially flush with floor level); and a guide assembly for accurately moving the outboard and inboard ends of the cover plate between the retracted and extended positions. The guide assembly further comprises a first guide assembly for positioning the outboard end of the cover plate between the retracted and extended positions and a second guide assembly for positioning the inboard end of the cover plate between the retracted and extended positions. In the illustrated embodiment, the first guide assembly comprises a pair of telescoping slide assemblies which linearly directs the outboard end of the cover plate, and the second guide assembly comprises a cam surface which selectively raises or lowers the inboard end of the cover plate. In order to accommodate the motion path imposed by the cam surface, the first guide assembly is pivotably attached to the cover plate.

12 Claims, 4 Drawing Sheets

TRAILER STEPWELL COVER MECHANISM

This is a continuation of copending application Ser. No. 08/752,752 filed Nov. 20, 1996, which is a continuation of Ser. No. 08/390,991 filed on Feb. 21, 1995 (abandoned).

BACKGROUND OF THE INVENTION

1. Field of the Invention

The present invention relates generally to trailers or motorhomes, and, more particularly, concerns a mechanism which automatically covers a stepwell or stairwell in a trailer when the stairs are not in use, and which automatically retracts underneath the floor of the trailer when the stairs are in use.

2. Description of the Prior Art

Trailers, or motorhomes, are generally rectangular shaped vehicles with an interior living space which is elevated above the ground by one or more set of wheels. To facilitate ease of entry and departure through the door, many trailers have a stepwell, comprised of one or more steps or stairs, which bridges the interior floor and the outside surface of the trailer. Although the stepwell makes climbing into and out of the trailer easier, it also produces a cavity or volume within the floor of the trailer which reduces already limited interior floor space. The user must also be careful not to inadvertently step in the cavity. Devices have thus been developed over the years to cover the stepwell when the stairs are not in use. Typically, however, these devices are cumbersome, box-like structures which simply fill the stepwell cavity. Moreover, these devices must be installed and removed manually by the user and must be stored within the relatively limited interior living quarters of the trailer.

OBJECTS AND SUMMARY OF THE INVENTION

The primary object of the present invention is to provide a mechanism which automatically covers the stepwell cavity of a trailer or motorhome when the stairs are not in use.

A related object of the present invention is to provide a mechanism which automatically retracts beneath the floor of the trailer to an retracted position when the stairs are in use.

Another object of the present invention is to provide a mechanism which increases and maximizes the amount of interior floor space in the trailer.

A further object of the present invention is to provide a mechanism of the foregoing type which is reliable and convenient to use.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
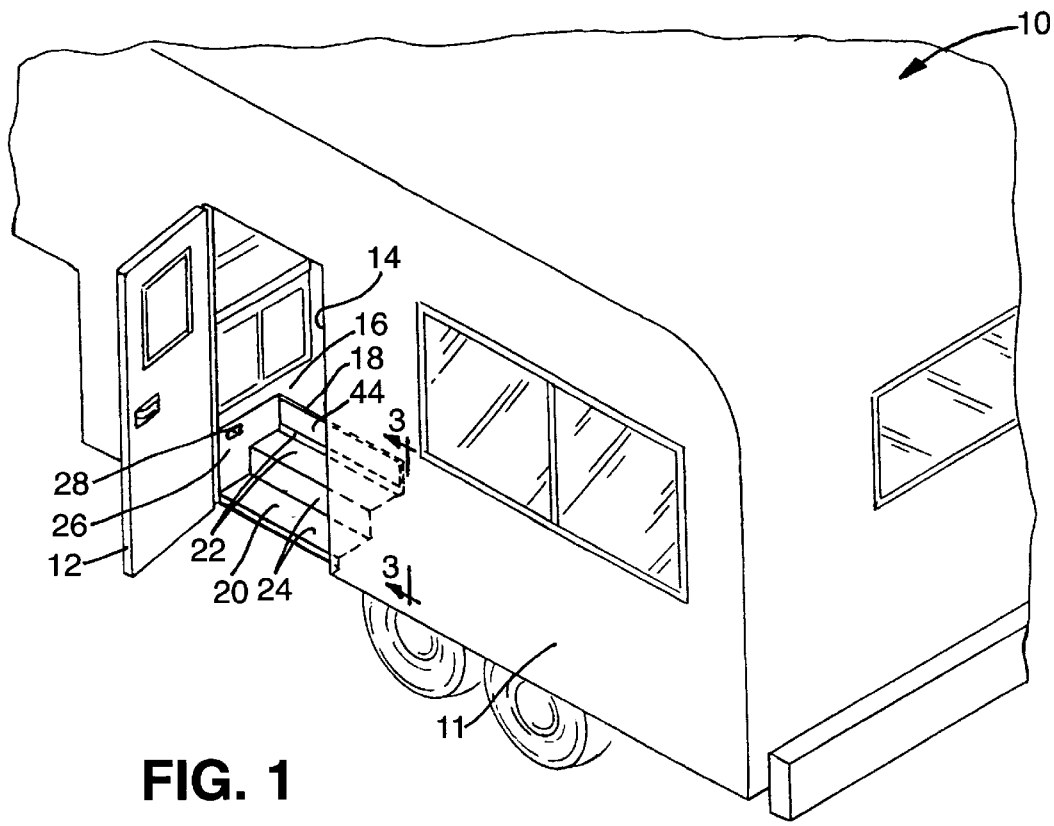
FIG. 1 is a perspective view of a trailer having a stepwell and a stepwell cover mechanism, in accordance with the present invention, positioned in a retracted (or stored) position.

Turning now to the drawings, FIG. 1 shows a perspective view of a trailer 10 and a cover mechanism of the present invention in a retracted, or stored position. The trailer 10 has an external surface 11, a doorway 14, a door 12, an internal floor 16, and a stepwell cavity 20. It will be appreciated that the stepwell cavity 20 is defined by at least one stair disposed below floor level, the doorway 14, and a pair of opposing sidewalls 26. In the illustrated embodiment, the stepwell cavity 20 has two steps and is defined by a top stair 22, a bottom stair 22, two opposing sidewalls 26, the generally vertical plane of the doorway 14, and the generally horizontal plane of the floor 16. Also, a ledge 18 in the floor 16 is defined by where the floor 16 intersects the top stair 22 of the stepwell cavity 20.

Figure 2:
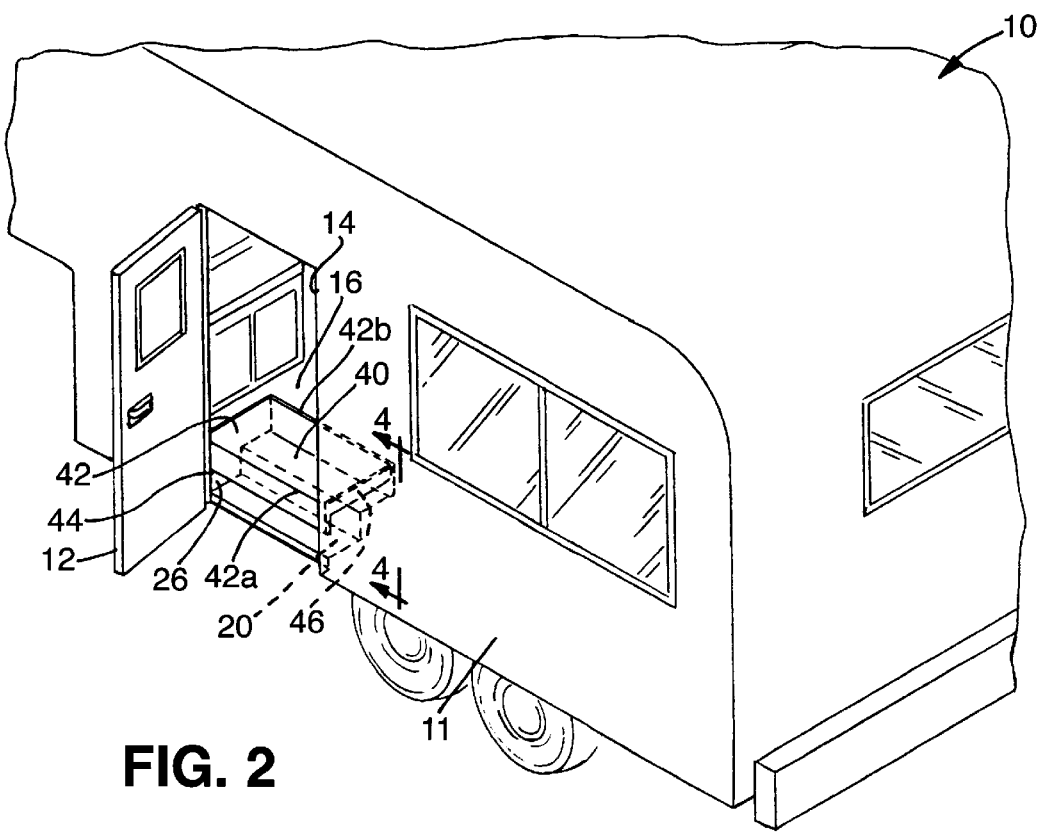
FIG. 2 is a perspective view of the trailer, similar to FIG. 1, wherein the stepwell cover mechanism is positioned in an extended (or operative) position.
Figure 3:
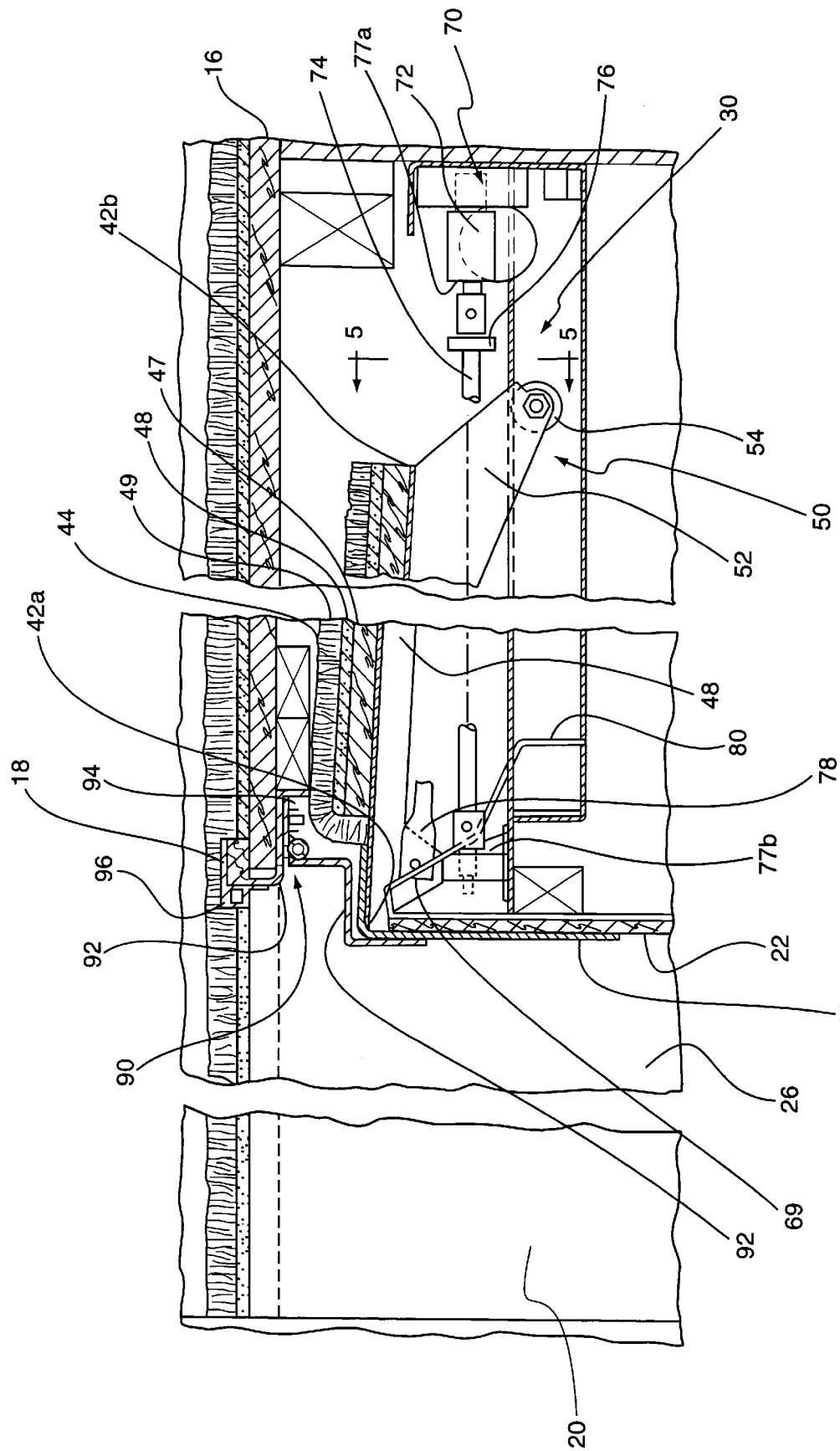
FIG. 3 is a cross-sectional view taken along line 3—3 in FIG. 1 showing the stepwell cover mechanism in the retracted (or stored) position.
Figure 4:
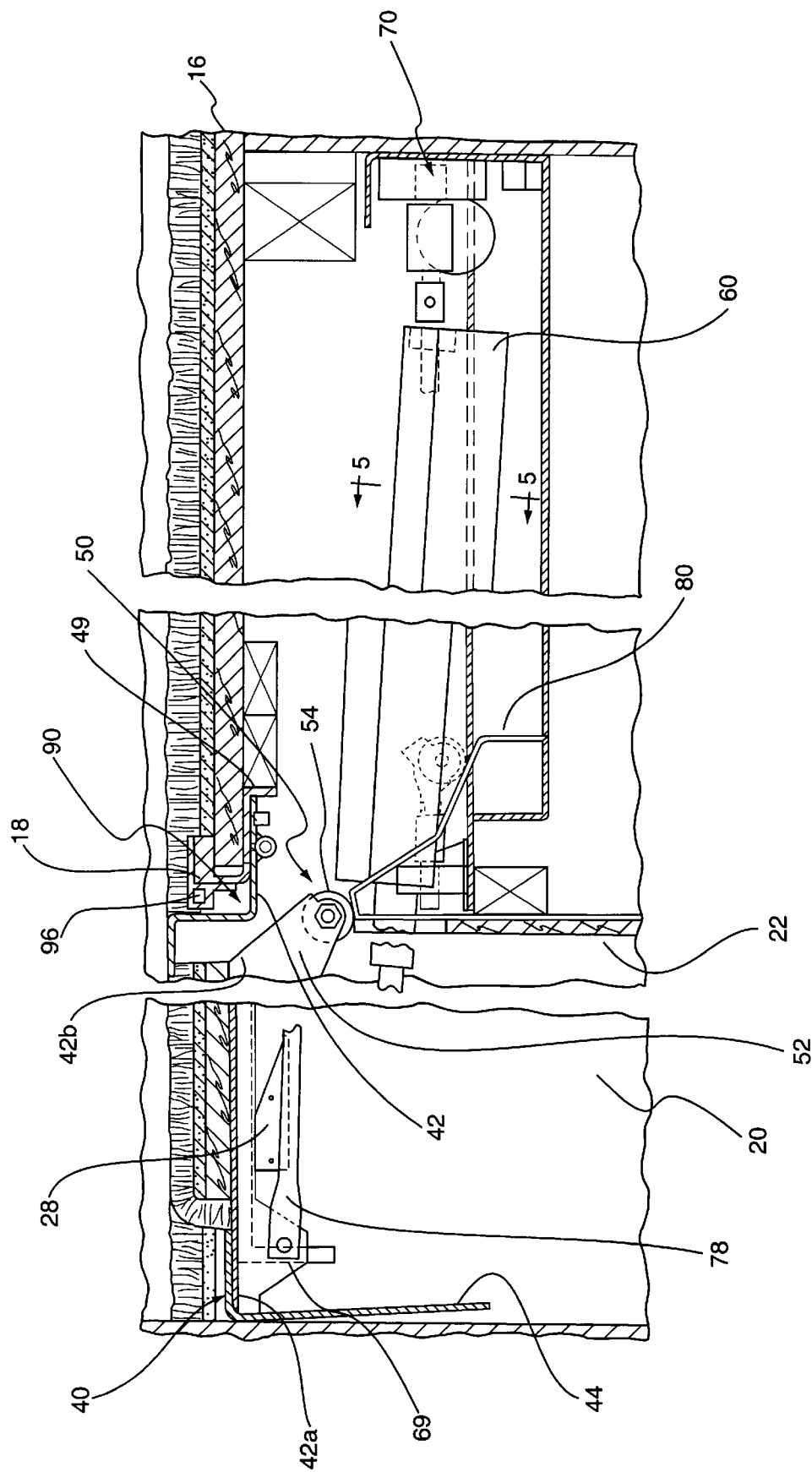
FIG. 4 is a cross-sectional view taken along line 4—4 in FIG. 2 showing the stepwell cover mechanism in the extended (or operative) position.

The cover mechanism 30 of the present invention comprises a cover plate 40 for covering the stepwell cavity 20. The cover plate 40 is movable between a retracted (or stored) position and an extended (or operative) position. In the retracted position, shown in FIGS. 1 and 3, the cover plate 40 is stored underneath the floor 16 and inboard of the stepwell cavity 20 thus permitting the stairs 22, 24 to be used. In the extended position, the cover plate 40 is substantially flush the floor 16, as shown in FIGS. 2 and 4. In accordance with certain objects of the present invention, the stepwell cavity 20 is completely covered when the cover plate 40 is in the extended position.

As shown in FIG. 2, the cover plate 40 is adapted to span the cavity 20 and be supported by the cavity walls 26. In the illustrated embodiment, the cover 40 has a generally rectangular cross-section defined by a flat top surface 42 (with an outboard end 42a and an inboard end 42b) and a protruding edge member 44. The edge member 44 is coupled to the outboard end 42a of the stepwell cover 40 such that it is substantially perpendicular to the top surface 42 of the cover 40, and is disposed such that, when the cover plate 40 is in the retracted position, the face of the edge member 44 will be in contact with the vertical portion of the top stair 22, as shown in FIG. 3. It will be appreciated that the cover plate 40 may have any cross-section adapted to span the cavity 20. It will be further appreciated that when the cover plate 40 is in the extended position, the outboard end 42a of the cover plate 40 is substantially adjacent to the plane of the doorway 14 while the inboard end 42b is substantially adjacent to the ledge 18 in the floor 16. In accordance with the present invention, support brackets 28—mounted near the top of both sidewalls 26—are also provided. When the cover plate 40 is in the extended position, the brackets 28 engage and vertically support the underside of the cover plate 40. Also, in the embodiment depicted by FIGS. 3–5, the top surface 42 of the cover plate 40 is covered with successive layers of plywood 47, padding 48, and carpeting 49. Preferably, the carpeting 49 will match the carpeting installed on the floor 16 of the trailer 10.

In FIG. 3, the entire stepwell cover mechanism 30 of the present invention is shown in greater detail with the cover plate 40 in the retracted (or stored) position. In the retracted position, the stepwell cover mechanism 30 is situated in a compartment beneath the floor 16, inboard of the top stair 22, and subjacent the trailer floor 16.

In FIG. 4, the cover mechanism 30 is shown in the extended (or operable) position. In the extended position, the outboard end 42a of the cover plate 40 is substantially adjacent to the plane of the doorway 14 while the inboard end 42b is substantially adjacent to the ledge 18 in the floor 16, and both the outboard and inboard ends 42a, 42b are substantially flush with the floor 16 of the trailer 10.

In addition to the cover plate 40, the cover mechanism 30 of the present invention also comprises: an activation means 70 for selectively positioning the cover plate 40 between the retracted position (shown in FIGS. 1 and 3) and the extended position (shown in FIGS. 2 and 4); and a guide means for accurately moving the cover plate 40 into flush engagement with the trailer floor 16. The guide means is further comprised of a first guide means 60 for positioning the outboard end of the cover plate between the retracted and extended positions and a second guide means 80 for positioning the inboard end of the cover plate between the retracted and extended positions.

The activation means 70 is provided for selectively positioning the cover plate 40 between the retracted and extended positions. In the embodiment illustrated in FIG. 3, the activation means 70 comprises a motor 72 for rotating a threaded drive shaft 74. A drive nut 76, connected to the drive shaft 74, moves linearly along the drive shaft 74 in response to rotation of the drive shaft 74. An extension shaft 78, connecting the outboard end 42a of the cover plate 40 to the drive nut 76, is provided for positioning the cover plate 40 between the retracted and extended positions in response to the motion of the drive nut 76. As the motor 72 rotates the drive shaft 74, the drive nut 76 moves between a first stop 77a, corresponding to the retracted position, and a second stop 77b, corresponding to the extended position. Thus, as the nut 76 moves toward the second stop 77b, the nut 76 pushes the extension shaft 78 and the outboard end 42a of the stepwell cover 40 toward the extended position.

The guide means is provided for accurately moving the cover plate 40 between the retracted and extended positions. In the embodiment depicted in FIG. 4, the first guide means 60 is mounted to a storage chamber wall inboard of the stepwell cavity 20 at an angle relative to the floor 16 of the trailer 10. In operation, as the activation means 70 moves the stepwell cover 40 from the retracted position to the extended position, the first guide means 60 directs the outboard end 42a of the cover plate 40 to a height corresponding to floor level.

Figure 5:
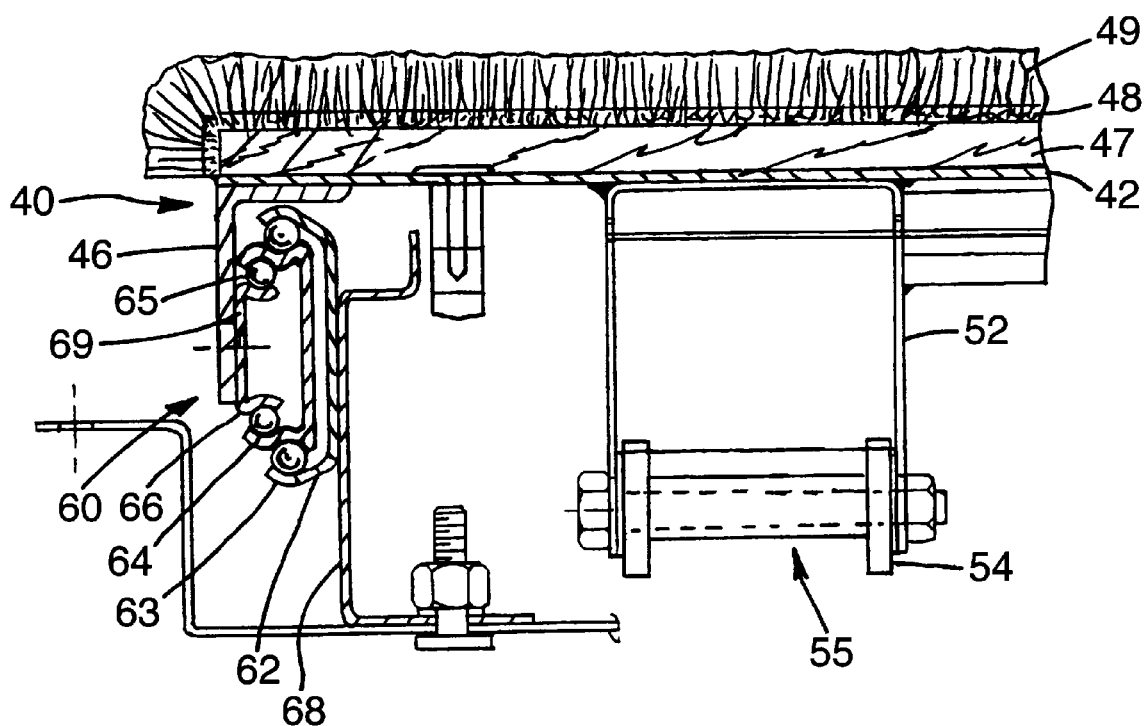
FIG. 5 is a cross-sectional view taken along line 5—5 in FIG. 4 showing a first guide means and a roller assembly.

In the embodiment depicted in FIG. 5, the first guide means 60 comprises a pair of telescoping slide assemblies attached to opposing portions 46 of the stepwell cover 40. The opposing portions 46 are coupled to the stepwell cover 40 such that they are substantially perpendicular to the top surface 42 of the cover 40 and substantially parallel to the opposing sidewalls 26 of the stepwell cavity 20. In the illustrated embodiment, each slide assembly comprises an outer slide 62 stationarily mounted in the storage chamber to a support 68, an intermediate slide 64 slidably attached to the outer slide 62, and an inner slide 66 slidably attached to the intermediate slide 64. Disposed between each slide 62, 64, 66 are ball bearings 63, 65 which facilitate movement amongst the slides so that the intermediate slide 66 and the inner slide 66 can telescope relative to each other. It will be appreciated that the outboard end of each interior slide 66 is pivotably attached to outboard end 42a of the cover plate 40 by way of pin joints 69. In operation, as the guide means 60 telescopes from the retracted position to the extended position, the outboard end 42a of the cover plate 40 is linearly directed toward the extended position and a height substantially equal to that of the floor 16.

The guide means 60 also comprises a second guide means 80 for positioning the inboard end 42b of the cover plate 40 between the retracted position, below floor level and the extended position, flush with the ledge 18 in the floor 16. In the embodiment depicted in FIGS. 3 and 4, it will be seen that the second guide means 80 comprises a cam surface or ramp. It will also be seen that the cover plate 40 has a roller means 50 for engaging the cam surface 80 in response to movement of the cover plate between the retracted and extended positions. The roller means 50 comprises a bracket 52 and a roller 54 attached to the underside of the cover plate 40 near the inboard end 42b. In operation, as the actuation means 70 drives the outboard end 42a of the cover plate 40 toward floor level along the first guide means 60, the roller 54 contacts the cam surface 80 which raises the inboard end 42b of the cover plate 40. And, when the roller 54 reaches the crest of the cam surface 80, as shown in FIG. 4, the cover mechanism 30 is in the extended position and both the outboard and inboard ends 42a, 42b of the cover plate 40 are substantially flush with the floor 16 of the trailer 10. As discussed briefly above, during this camming operation the cover plate 40 pivots relative to the first guide means 60 to permit the inboard end 42b of the cover plate 40 to accommodate the motion path imposed by the cam surface 80.

The cover mechanism 30 of the present invention may also include a hinge assembly 90 for covering the space between the ledge 18 in the floor 16 and the peak of the top stair 22 when the cover plate 40 is in the retracted position. In the embodiment depicted in FIGS. 3 and 4, the hinge assembly 90 comprises a generally Z-shaped flap 92, a support 94, and a flap stop 96. In particular, the support 94 is fixedly attached to the underside of the floor 16 in close proximity to the ledge 18 and the flap 92 is hingedly attached to the support 94. In use, when the cover plate 40 is in the retracted position, the flap 92 is in contact with the edge member 44 of the cover plate 40, as shown in FIG. 3, and, as the cover mechanism 30 moves to the extended position, the flap 92 rotates approximately 90° and contacts the flap stop 96 positioned along the aforementioned ledge 18, as depicted in FIG. 4.

When the cover mechanism 30 is ultimately withdrawn from the extended position, such that the cover plate 40 is moving towards the retracted position, the above described processes are essentially reversed. The direction of the motor 72 is alternated by way of an on-off switch (not shown) and the drive shaft 74 and attached drive nut 76 are now driven toward the first stop 77a. As the nut 76 moves in this direction, the extension shaft 78 pulls the cover plate 40 back underneath the floor 16 (and inboard of the top stair 22). As the cover descends, the roller 54 moves down the cam surface 80 and the inboard end 42b of the cover 40 pivots slightly downward. Throughout this retraction process, the outboard end 42a of the cover 40 is urged directly back along the telescoping guide means 60 until the edge member 44 is flush against the vertical face of the top stair 22 (i.e. the edge member 44 urges the interior slides 66 back into the intermediate slides 64 and the outer slides 66). Also, the flap 92 of the hinge assembly 90 falls back to its original (retracted) position in contact with the edge member 44, as shown in FIG. 3.

I claim as my invention:

1. A stepwell cover mechanism for selectively covering a stepwell cavity in a trailer, the stepwell cavity defined by at least one stair disposed below a floor of the trailer, a doorway, and opposing sidewalls, the stepwell cover mechanism comprising:
   a cover plate having outboard and inboard ends for substantially spanning the opposing sidewalls and covering the cavity between the outboard and inboard ends and movable between a retracted position wherein the cover plate is disposed for permitting usage of the steps and an extended position wherein the cover plate is disposed for covering the stepwell cavity; and
   a guide assembly for selectively positioning the cover plate between the retracted and extended positions, the guide assembly including a cam surface generally disposed inboard of the stepwell cavity and a roller means operatively attached to the cover plate for selectively engaging first and second ends of the cam surface in response to movement of the cover plate between the retracted and extended position, wherein the inboard end of the cover plate is positioned substantially level with the floor of the trailer when the roller means engages the second end of the cam surface.

2. A stepwell cover mechanism as defined in claim 1 wherein the guide assembly positions the cover plate below floor level and inboard of the stepwell cavity in the retracted position.

3. A stepwell cover mechanism as defined in claim 1 wherein the guide assembly positions the cover plate below floor level and adjacent to one of the sidewalls of the stepwell cavity in the retracted position.

4. A stepwell cover mechanism as defined in claim 1 wherein the guide assembly includes a telescoping slide assembly for supporting the cover plate.

5. A stepwell cover mechanism as defined in claim 4 wherein the telescoping slide assembly has first and second ends wherein the first end of the telescoping slide assembly is mounted inboard of the stepwell cavity and below floor level and the second end is pivotably attached to the outboard end of the cover plate and extends and retracts in conjunction with the cover plate.

6. A stepwell cover mechanism as defined in claim 1 comprising an activator operatively attached to the cover plate for selectively positioning the cover plate between the retracted and extended positions.

7. A stepwell cover mechanism as defined in claim 1 wherein the cover plate includes a protruding edge member having a flat face coupled to the outboard end of the cover plate which is substantially perpendicular to the surface of the cover plate, the edge member being disposed such that when the cover plate is in the retracted position, the face of the edge member is in contact with a vertical portion of the stair and when the cover plate is in the extended position, the face of the edge member is substantially adjacent to the doorway.

8. A stepwell cover mechanism as defined in claim 7 comprising a hinge assembly for covering a space between the floor and the stair when the cover plate is in the retracted position.

9. A stepwell cover mechanism as defined in claim 8 wherein the hinge assembly comprises:
   a support fixedly attached to the underside of the floor near a ledge defined by where the floor intersects the stair of the stepwell cavity;
   a flap hingedly attached to the support, the flap being disposed such that when the cover plate is in the retracted position, the flap is in contact with the edge member of the cover plate; and
   a flap stop positioned along the ledge, the flap stop being disposed such that when the cover plate is in the extended position, the flap is in contact with the flap stop.

10. The mechanism as set forth in claim 1 comprising a hinge assembly for covering a space between the inboard end and the floor when the cover plate is in the extended position.

11. A stepwell cover mechanism for selectively covering a stepwell cavity in a trailer, the stepwell cavity defined by at least one stair disposed below a floor of the trailer, a doorway, and opposing sidewalls, the stepwell cover mechanism comprising:
   a cover plate having outboard and inboard ends for spanning the opposing sidewalls and covering the cavity between the outboard and inboard ends and movable between a retracted position wherein the cover plate is disposed for permitting usage of the steps and an extended position wherein the cover plate is disposed for covering the stepwell cavity, and wherein the cover plate includes a protruding edge member having a flat face coupled to the outboard end of the cover plate which is substantially perpendicular to the surface of the cover plate, the edge member being disposed such that when the cover plate is in the retracted position, the face of the edge member is in contact with a vertical portion of the stair and when the cover plate is in the extended position, the face of the edge member is substantially adjacent to the doorway; and
   a guide assembly for selectively positioning the cover plate between the retracted and extended positions, the guide assembly comprising a cam assembly for selectively positioning the inboard end of the cover plate below floor level when the cover plate is in the retracted position and substantially level with the floor when the cover plate is in the extended position in response to engagement between the cover plate and a cam surface; and
   a hinge assembly for covering a space between the floor and the stair when the cover plate is in the retracted position having a support fixedly attached to the underside of the floor near a ledge defined by where the floor intersects the stair of the stepwell cavity, a flap hingedly attached to the support, the flap being disposed such that when the cover plate is in the retracted position, the flap is in contact with the edge member of the cover plate, and a flap stop positioned along the ledge, the flap stop being disposed such that when the cover plate is in the extended position, the flap is in contact with the flap stop.

12. A stepwell cover mechanism for selectively covering a stepwell cavity in a trailer, the stepwell cavity defined by at least one stair disposed below a floor of the trailer, a doorway, and opposing sidewalls, the stepwell cover mechanism comprising:
   a cover plate having outboard and inboard ends for spanning the opposing sidewalls and covering the cavity between the outboard and inboard ends and a guide assembly for moving the cover plate between a retracted position wherein the cover plate is disposed for permitting usage of the steps and an extended position wherein the cover plate is disposed for covering the stepwell cavity, and
   a hinge assembly for covering a space between the floor and the stair when the cover plate is in the retracted position, including a support fixedly attached to the underside of the floor near a ledge defined by where the floor intersects the stair of the stepwell cavity; a flap hingedly attached to the support, the flap being disposed such that when the cover plate is in the retracted position, the flap hangs downwardly to cover the space between the floor and the stair, and a flap stop positioned along the ledge, the flap stop being disposed such that when the cover plate is in the extended position, the flap is in contact with the flap stop.

* * * * *